United States Patent
Mourn et al.

(10) Patent No.: US 7,783,812 B2
(45) Date of Patent: Aug. 24, 2010

(54) EXTENDED SERIAL BUS ARCHITECTURE AND METHOD

(75) Inventors: Richard Mourn, Colorado Springs, CO (US); Barry Walker, Jr., Elbert, CO (US)

(73) Assignee: Astek, Inc, Colorado Springs, CO (US)

( * ) Notice: Subject to any disclaimer, the term of this patent is extended or adjusted under 35 U.S.C. 154(b) by 134 days.

(21) Appl. No.: 11/986,955

(22) Filed: Nov. 27, 2007

(65) Prior Publication Data

US 2008/0126654 A1    May 29, 2008

Related U.S. Application Data

(60) Provisional application No. 60/861,502, filed on Nov. 29, 2006.

(51) Int. Cl.
  *G06F 13/00*    (2006.01)
(52) U.S. Cl. ................ 710/300; 710/16; 710/64; 710/72
(58) Field of Classification Search ........... 710/8–19, 710/300–317
See application file for complete search history.

(56) References Cited

U.S. PATENT DOCUMENTS

| | | | | |
|---|---|---|---|---|
| 5,875,313 | A * | 2/1999 | Sescila et al. | 710/305 |
| 6,202,103 | B1 * | 3/2001 | Vonbank et al. | 710/15 |
| 6,718,424 | B1 * | 4/2004 | Cruz | 710/315 |
| 6,738,843 | B2 * | 5/2004 | Bennett | 710/104 |
| 6,892,262 | B1 * | 5/2005 | Taki | 710/300 |
| 6,895,447 | B2 * | 5/2005 | Brewer et al. | 710/11 |
| 7,043,565 | B1 * | 5/2006 | Madden et al. | 709/250 |
| 7,124,367 | B2 * | 10/2006 | Anderson et al. | 715/735 |
| 7,418,527 | B2 * | 8/2008 | Bichot et al. | 710/10 |
| 2003/0090517 | A1 * | 5/2003 | Anderson et al. | 345/747 |

* cited by examiner

*Primary Examiner*—Raymond N Phan
(74) *Attorney, Agent, or Firm*—Dale B Halling

(57) ABSTRACT

The present invention is directed to a serial bus extension that provides for a new class of 1394 devices called versaphy devices. A versaphy device has a static (permanent or semi-permanent) address or versaphy label. In addition, the versaphy device has a new register structure called a versaphy register. The versaphy register may contain the versaphy label. The versaphy register can be written to by non-local devices such a controller. New simple versaphy packets are defined to facilitate communication between a versaphy device and a controller. The versaphy device can transmit unsolicited responses. These features reduce the complexity necessary for a device to connect to a 1394 bus and, therefore, reduce the cost of these devices.

27 Claims, 5 Drawing Sheets

EXTENDED SERIAL BUS ARCHITECTURE AND METHOD

RELATED APPLICATIONS

The present invention claims priority on provisional patent application, Ser. No. 60/861,502, filed on Nov. 29, 2006, entitled "Information for VersaPHY technology and IEEE-1394 specific patents" and is hereby incorporated by reference.

STATEMENT REGARDING FEDERALLY SPONSORED RESEARCH

Not Applicable

THE NAMES OF THE PARTIES TO A JOINT RESEARCH AGREEMENT

Not Applicable

REFERENCE TO A SEQUENCE LISTING, A TABLE, OR A COMPUTER PROGRAM LISTING

Not Applicable

BACKGROUND OF THE INVENTION

IEEE-1394 (1394) defines a serial interface bus that is high speed and has a number of features that make it a very capable bus. The 1394 bus is sometimes referred to Firewire™ (trademark of Apple) and iLink™ (trademark of Sony). Unfortunately, for simple applications such as a sensor, the 1394 bus may be overkill. Even for these simple applications, the 1394 bus still requires every device be at least transaction capable, as defined by IEEE-1394. As a result, the 1394 bus protocol makes it too complicated and expensive to attach these simple devices to a 1394 bus.

Thus there exists a need for an extension to the 1394 serial interface bus that allows simple devices to connect to the 1394 bus but not be required to perform all the functions of a 1394 device, thereby reducing the complexity and cost of implementing these simple devices on a 1394 bus.

BRIEF SUMMARY OF INVENTION

These and other problems are solved by a serial bus extension that provides for a new class of 1394 devices called VersaPHY devices. The term VersaPHY is used to describe a technique of adding a new communication protocol to an existing data bus. A VersaPHY device uses a static (permanent or semi-permanent) address called a VersaPHY label. In addition, the VersaPHY device has a new register structure called VersaPHY registers. The VersaPHY registers will contain the VersaPHY label in one embodiment. The VersaPHY register can be written to by non-local devices such a controller. New, simple VersaPHY packets are defined to facilitate communication between both VersaPHY devices and VersaPHY devices and a controller. The VersaPHY device can transmit unsolicited responses. These features reduce the complexity necessary for a device to connect to a 1394 bus and therefore reduce the cost of these devices.

DETAILED DESCRIPTION OF THE INVENTION

The present invention is directed to a serial bus extension that provides for a new class of 1394 devices called VersaPHY devices. The term VersaPHY is used here to describe a technique of adding a new communication protocol to an existing data bus. This extension could also apply to other technologies where two protocols coexist on the same bus or network; one is the existing protocol, and the second is a protocol that doesn't harm or disrupts the first but is used to communicate at a different level or a different type of information.

In one embodiment, new simple IEEE-1394 PHY packets are used to implement this protocol. These packets are called VersaPHY Packets or VP-Packets. A new register set may manage the protocol. These registers are called VersaPHY Registers or VP-Registers.

Devices utilizing this protocol and containing these registers are called VersaPHY Devices or VP-Devices. Local or non-local controllers may write and read VP-Registers in VP-Devices. Such devices are called VersaPHY Controllers or VP-Controllers.

In one embodiment, VP-Devices may contain several sets of VP-Registers to implement different systems. Each of these different VP-Register sets and its associated logic is called a VP-Function. VP-Functions may be standardized by conforming their architecture and operation to a VersaPHY profile specification (VP-Profile.)

A VersaPHY function has a static (permanent or semi-permanent) address. This address is called a VersaPHY label or VP-Label. The VersaPHY register set will contain the VersaPHY label in one embodiment. The VersaPHY device can transmit unsolicited response packets. These features reduce the complexity necessary for a device to connect to a 1394 bus and, therefore, reduce the cost of these devices.

Figure 1:
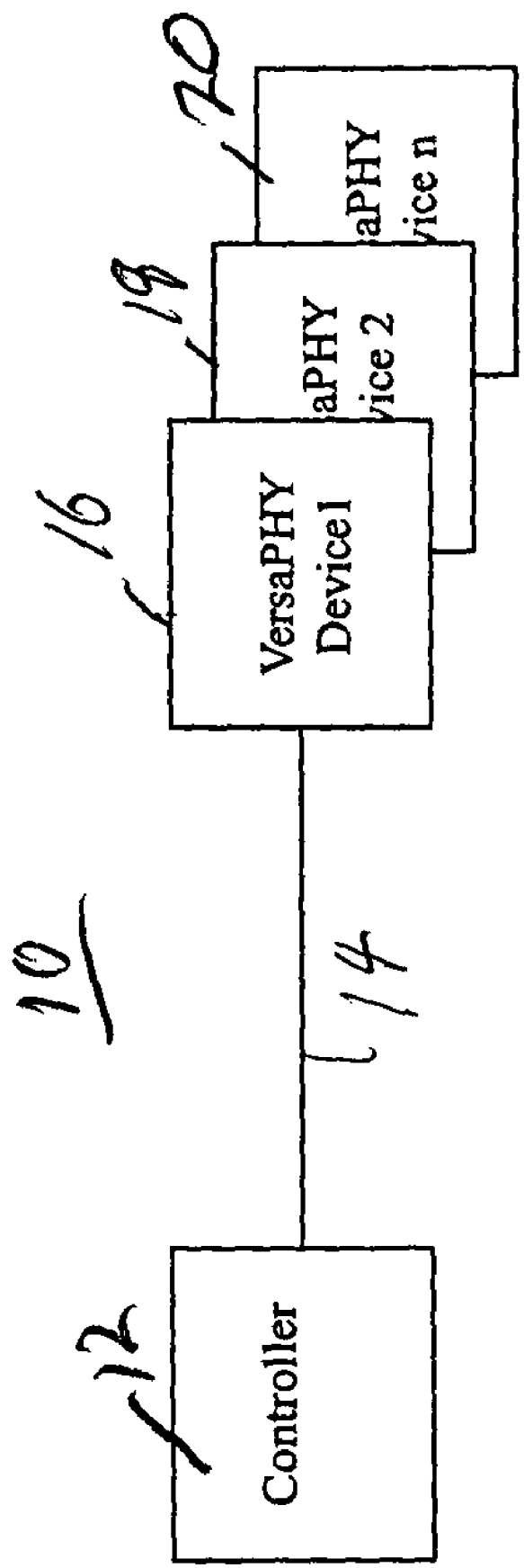
FIG. 1 is a block diagram illustrating the extended serial bus architecture in accordance with one embodiment of the invention.

FIG. 1 is a block diagram illustrating the extended serial bus architecture 10 in accordance with one embodiment of the invention. The architecture 10 has a controller 12 coupled to a 1394 bus 14 (note as used herein, 1394 means IEEE-1394 serial bus interface). A plurality of VersaPHY devices 16, 18 & 20 is also coupled to the 1394 bus 14.

Figure 2:
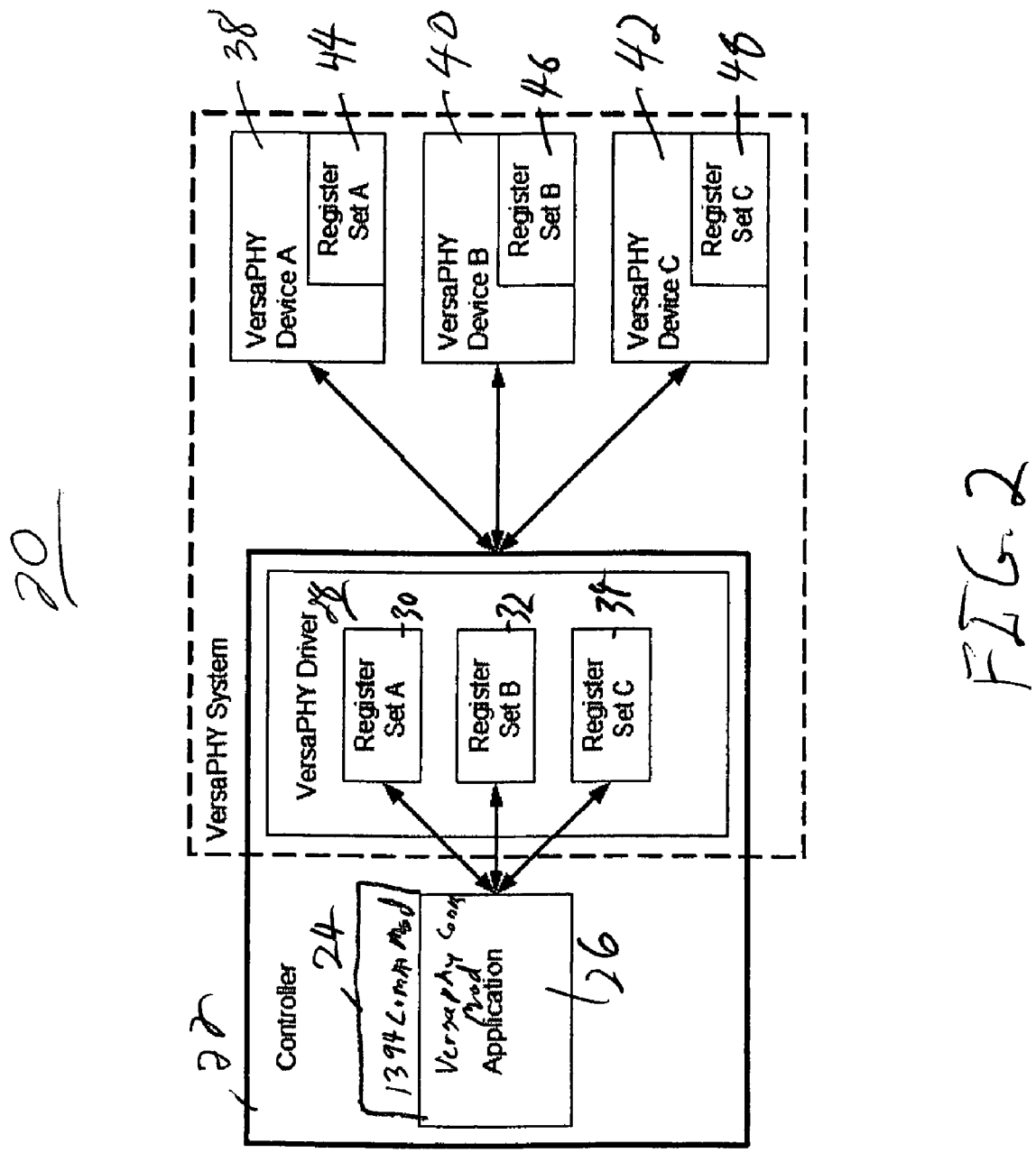
FIG. 2 is a block diagram illustrating the extended serial bus architecture in accordance with one embodiment of the invention.

FIG. 2 is a block diagram illustrating the extended serial bus architecture 20 in accordance with one embodiment of the invention. This figure shows the details of how the VersaPHY extended serial bus architecture works. A controller 22 will typically include a 1394 communication module 24 and a VersaPHY communication module 26. A VP-Controller (VersaPHY Controller) can be any 1394 node with software or firmware to send and receive VersaPHY packets and implement the VP-Controller profile specification. The controller 22 has a VP-driver 28 that includes a set of registers 32, 34, 36. A plurality of VP-devices 38, 40, 42 is coupled to each other and the controller(s) 22 by a 1394 bus. The VP-devices 38, 40, 42 have mirror registers 44, 46, 48 to the registers 30, 32, 34 in the controller 22. A typical VP-Controller 22 may be a PC with 1394 OHCI hardware and generic 1394 and VersaPHY software drivers. A typical VP-Device 38 can be implemented without software. In cases where software is required for an application, it need not know anything about 1394 or VersaPHY. A VP-Controller 22 using a full VersaPHY driver stack insulates applications from data transmission issues. With VP-Device hardware and the VP-Controller software managing all aspects of remote data exchange, application development is not concerned with VersaPHY protocol or 1394 details. The application can manage registers on remote networked devices as if they are local registers. Through VP-Profile defined protocol(s), local and remote registers are synchronized without any involvement from the application. Note that the VersaPHY system allows for multiple controllers. Two VersaPHY devices may communicate between themselves using VP-Packets. A VP-Controller is not strictly required. In other implementations, the VP-Devices may be configured by a VP-Controller then left to communicate with each other without VP-Controller involvement. In another embodiment, the mirror registers in the controller are not necessary.

Figure 3:
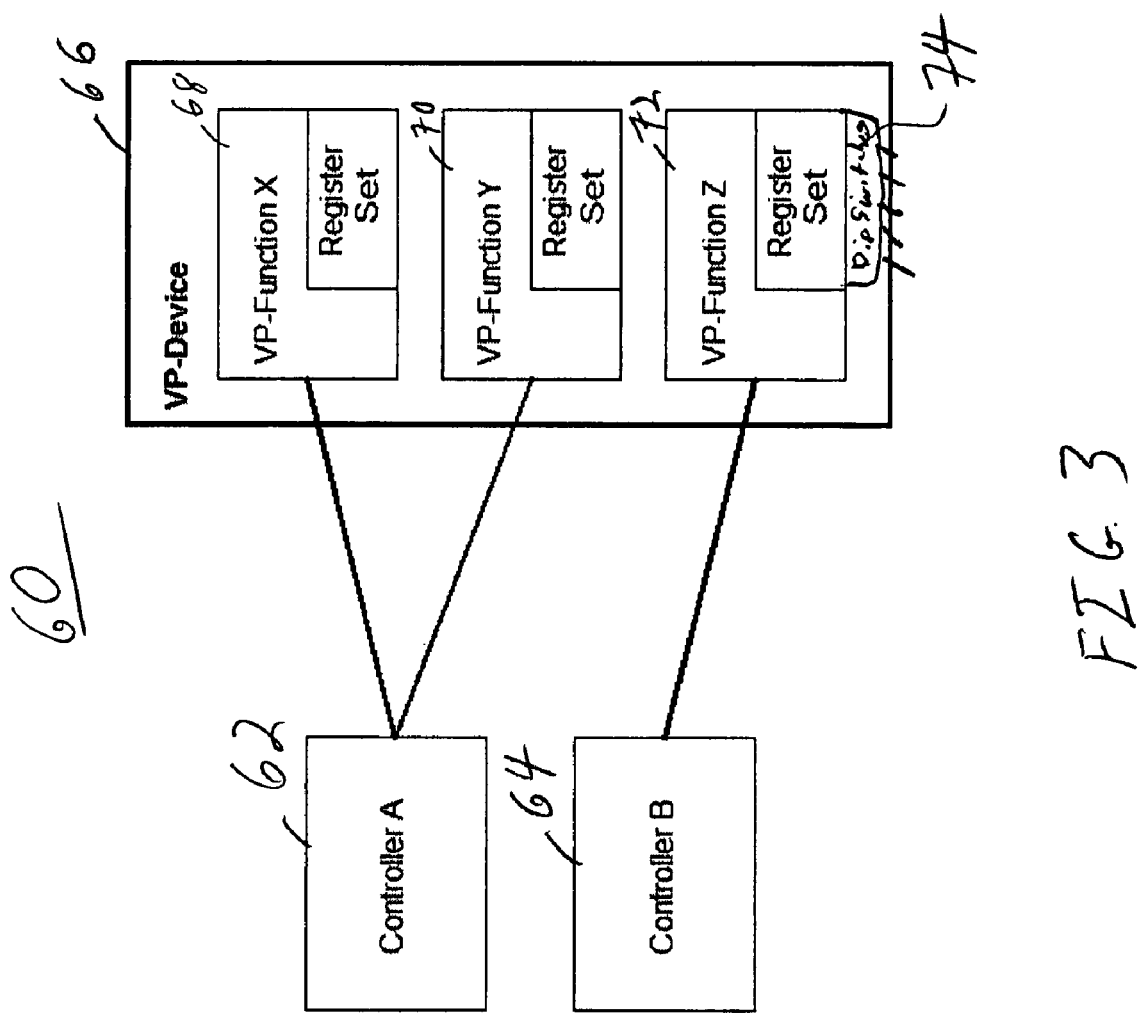
FIG. 3 is a block diagram illustrating the extended serial bus architecture in accordance with one embodiment of the invention.

FIG. 3 is a block diagram illustrating the extended serial bus architecture 60 in accordance with one embodiment of the invention. The architecture has a first VP-Controller 62 and a second VP-Controller 64 that both communicate with a single VP-Device 66. The VP-Device 66 has three VP-Register sets 68, 70 & 72. Each register set 68, 70 & 72 corresponds to a different VP-Function. The first controller 62 communicates with the first two functions 68 & 70 and the second controller 64 communicates with the third function 72. Each physical VP-Device 66 may provide multiple logical VP-Functions 68, 70 & 72. Each of these VP-Functions 68, 70 & 72 may operate autonomously. Each VP-Function 68, 70 & 72 may be managed by a different VP-Controller 62 & 64. Each VP-Function 68, 70 & 72 is addressed using its own VP-Label. VP-Labels may be assigned by a controller or through local means. In one embodiment, the VP-Label is set using dip switches 74. Note that the connections shown are logical. Other non-VersaPHY 1394 devices may operate along side VersaPHY devices on the same 1394 network. VersaPHY systems can be added to existing 1394 systems to add value to existing infrastructure.

Figure 4:
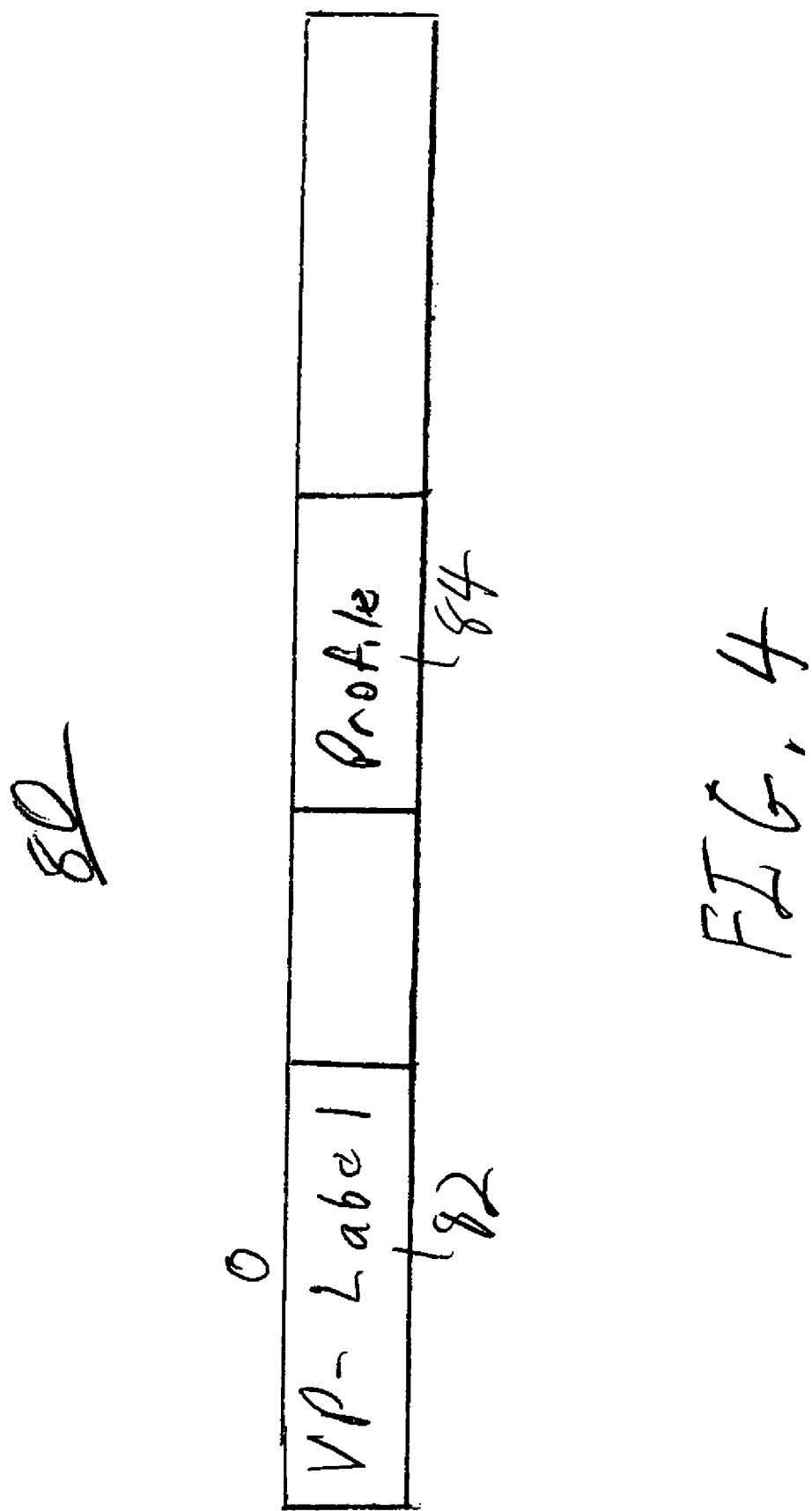
FIG. 4 shows a set of registers used in the extended serial bus architecture in accordance with one embodiment of the invention.

FIG. 4 shows a set of registers 80 used in the extended serial bus architecture in accordance with one embodiment of the invention. Note that each VP-Function has a set of registers. The base register (register 0) contains the VP-Label 82 for the VP-Function. The VP-Function 84 is a uniquely addressable function of the VersaPHY device. VP-Labels occupy a 14-bit field in register offset 0 of each VP-Function. VP-Label-based request packets contain the VP-Label of the VP-Function(s) to which they are addressed. VP-Label-based response packets contain the VP-Label of the VP-Function issuing the response. Extending the use of permanent or semi-permanent labels for addressing other asynchronous packets is also possible.

In the 1394 standard, the Physical-ID used to address a devices is not static and can change from bus reset to bus reset and bus configuration to bus configuration. This results in system overhead and complexity, thus making the connection of even simple device burdensome. As a result, it can be too complex and expensive to implement such devices with a 1394 interface. VersaPHY labels solve this problem by remaining static across IEEE-1394 bus resets. VersaPHY labels may also be static across power cycles. In other embodiments, VersaPHY Labels may be changed by power cycles and/or by local or remote controllers. Note that VP-Devices (functions) may also be accessed using Physical-ID addressing.

VersaPHY Registers (VP-Registers) are accessed using the VP-Packet. VP-Registers are separate from the standard PHY registers defined in IEEE-1394a-2000 and IEEE-1394b-2002. VP-Registers are structured to support simple to complex devices. A VP-Device may contain more than one VP-Function allowing a single VP-Device to perform several identical or disparate functions. Each VP-Function within a VP-Device has a unique VP-Register space. The register space for each VP-Function is defined by a VersaPHY profile (VP-Profile) specification. VersaPHY register addressing is divided into 16 byte 'blocks'. The VP-Function supports the first block (block 0) of 'Base registers' for each VP-Device register space. Additional profile-defined register blocks may be specified by each VP-Profile.

VP-Registers are accessed by two mechanisms: VP-Label packets, and Physical-ID packets. Physical-ID addressing is more strictly defined to provide for generic VP-Device discovery, VP-Function discovery, and VP-Label setup. Once VP-labels are properly configured, VP-Label addressing offers greater simplicity and flexibility. VP-Label and Physical_ID accesses are performed on logically separate register sets. Many of the basic status fields are duplicated in the same relative position, whether accessed via Physical_ID or VP-Label packets. Other fields required for Physical_ID access are not allocated as required spaces in the VP-Label register map. A minimal VP-Function represents a 16-byte VP-Label register block and a 16-byte Physical_ID register block. VP-Profiles may specify duplicate registers between these blocks and set other registers to constants to minimize the memory requirements for the implementation. Any fields not required for VP-Label access may be duplicated in the VP-Label register space to simplify address decoding logic in the VP-Device. All duplication or differences between VP-Label and Physical_ID access are specified in the VP-Profile specification. This provides maximum flexibility for unique requirements of individual VP-Profiles. Physical_ID access to a specific register in a specific node is addressed using the Blk_Number and PReg_Off (12 bits total). This limits the number of Physical_ID-addressable registers to 4K bytes per node. The number of VP-Functions for each VP-Device is then limited to 256, since each VP-Function requires a minimum 16-byte register block. Fewer functions are possible when implementing VP-Profiles that require more than one block per VP-Function. VP-Label access of a specific register within a VP-Function is addressed using the Block Address and LReg_Off. The 'Block Address' specified by a VP-Profile can range from 0 to 16 bits (assuming an 8- to 24-bit data field): This allows 16- to 1M-byte wide registers per VP-Function label space. In one embodiment, a 1394 device can have a static (permanent or semi-permanent) address like the VersaPHY label.

The VersaPHY architecture supports polling of the VP-Device by a VP-Controller. Using the polling model, the VP-Controller simply reads VP-Registers to get information from the VP-Device. These read transactions may use Physical-IDs or VP-Labels. This model has the advantages of being simple and acknowledging each read. However, it requires more VP-Controller CPU cycles than other models, and loading of the VP-Controller may affect how often each VP-Device is polled.

The VersaPHY architecture also supports a VP-Device-initiated unsolicited response mechanism. Using this model, after the VP-Controller configures the VP-Device, the VP-Device autonomously broadcasts unsolicited response VP-Packets. The response packets contain the VP-Label of the VP-Function sending the response. This allows any VP-Controller to listen to the bus and collect data from all VP-Functions without expending any extra cycles. In this approach, the VP-Device producing the data is responsible for the timing of the data transmission. It also generates less bus traffic. This is the most efficient model, but the packets are not acknowledged. If guaranteed data delivery is required, the application will have to ensure it at a higher level. In multiple VP-Controller environments with many VP-Functions, hardware filtering of VP-Packets using ranges of VP-labels may be advantageous to reduce the number of packets controllers must parse in software.

In order to implement the VersaPHY architecture, two sets of VP-packets are defined. The first set is addressed using standard 1394 Physical-IDs and the second set is addressed using the new VersaPHY Labels. The VP-Packets are read request, read response, write request and write response using either of the addressing schemes.

Figure 5:
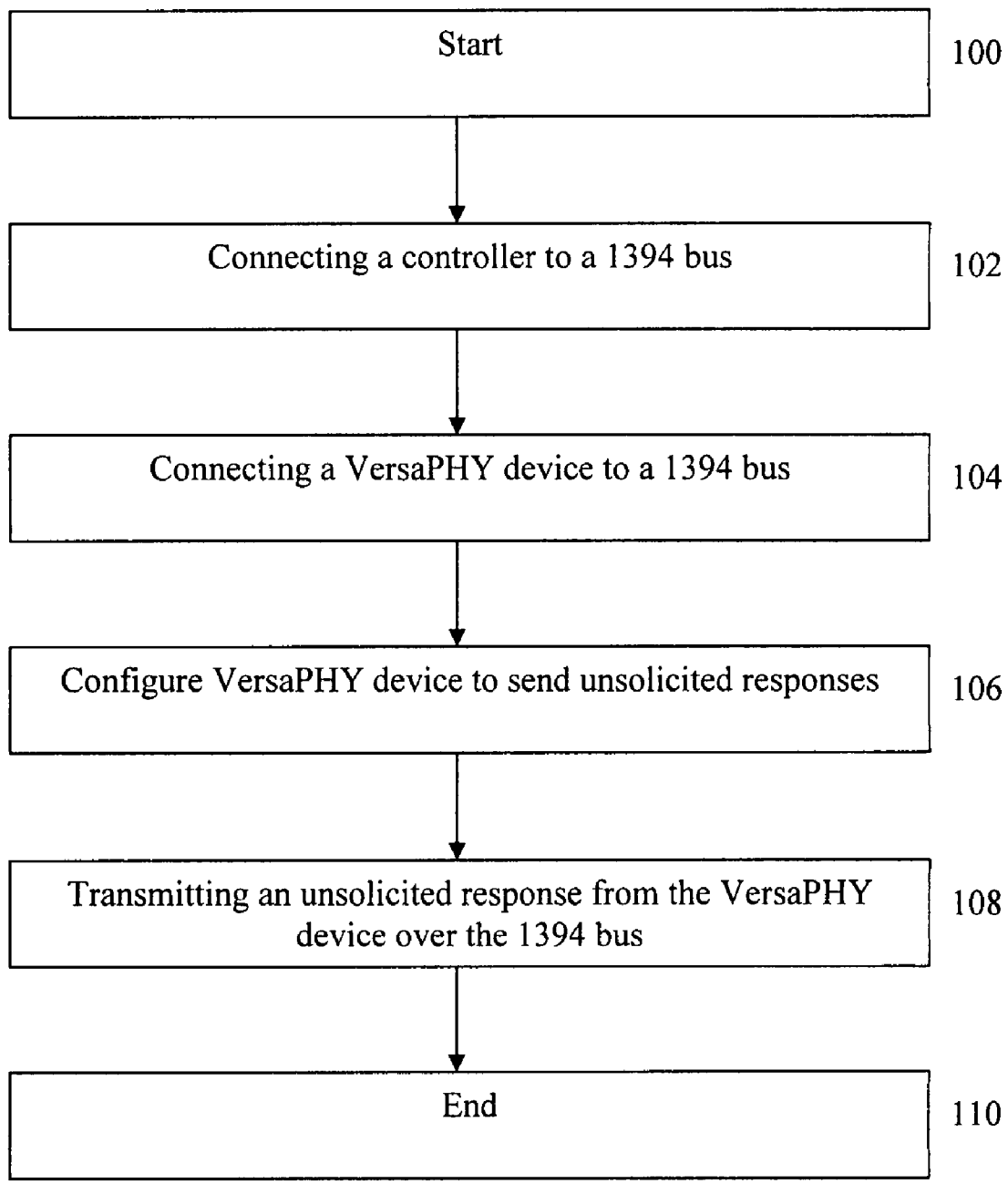
FIG. 5 is flow chart of the steps used in a method of operating an extended serial bus architecture.

FIG. 5 (see new flow chart) is a flow chart of the steps used in a method of operating an extended serial bus architecture. The process starts, step 100, by connecting a controller to a 1394 bus at step 102. A VersaPHY device is connected to the 1394 bus at step 104. At step 106, an unsolicited response is transmitted from the VersaPHY device to the controller over a 1394 bus, which ends the process at step 108.

In one embodiment, the controller is populated with a VersaPHY module. The VersaPHY Label is set for the Versa-PHY Device. The VP-controller may transmit a VP-write packet to the VP-Device. The payload of the VP-write packet is written in a VP-Register of the VP-Device. The VP-write packet is addressed using a VP-Label. In another embodiment the VP-write packet is addressed using a Physical-ID address. In one embodiment, the VP-Device has a VP-Register set based on a VP-Profile specification.

Thus, there has been described an extended serial bus architecture that allows simple devices to connect to the 1394 bus but not be required to perform all the functions of a 1394 device, therefore reducing the cost of implementing these simple devices on a 1394 bus.

While the invention has been described in conjunction with specific embodiments thereof, it is evident that many alterations, modifications, and variations will be apparent to those skilled in the art, in light of the foregoing description. Accordingly, it is intended to embrace all such alterations, modifications, and variations in the appended claims.

What is claimed is:

1. An extended serial bus architecture, comprising:
   a controller having a 1394 communication module and a versaphy communication module;
   a 1394 bus coupled to the controller; and
   a versaphy device coupled to the 1394 bus, having a static address that does not change upon a bus reset and where the versaphy device can be addressed on the 1394 bus without using a physical address wherein the versaphy device has a versaphy register that is writeable by the controller.

2. The bus architecture of claim 1, wherein the versaphy device has a versaphy label which is the static address.

3. The bus architecture of claim 2, wherein the versaphy label is a permanent address.

4. The bus architecture of claim 1, wherein the controller can transmit a versaphy packet over the 1394 bus to the versaphy device using the versaphy label.

5. The bus architecture of claim 1, wherein the versaphy register has a profile.

6. The bus architecture of claim 1, wherein the versaphy register is accessed by the controller using a versaphy label.

7. The bus architecture of claim 6, wherein the versaphy register is accessed by the controller using a physical-id address.

8. The bus architecture of claim 1, wherein the controller can transmit a versaphy packet over the 1394 bus to the versaphy device using a physical-id address.

9. The bus architecture of claim 1, wherein the versaphy register is accessed by the controller using a versaphy packet having a physical-id address and a block number.

10. The bus architecture of claim 1, wherein the versaphy register is accessed by the controller using a versaphy packet having a versaphy label and a block address.

11. The bus architecture of claim 1, wherein the versaphy device transmits an unsolicited response to the controller over the 1394 bus.

12. The bus architecture of claim 1, wherein the controller transmits a versaphy read packet to the versaphy device.

13. An extended serial bus architecture, comprising:
    a controller having a versaphy communication module;
    a 1394 bus coupled to the controller; and
    a versaphy device coupled to the 1394 bus, having a static address that does not change upon a bus reset and where the versaphy device can be addressed on the 1394 bus without using a physical address wherein the versaphy device has a versaphy register that is writeable by the controller.

14. The bus architecture of claim 13, wherein the versaphy device has a versaphy label which is the static address.

15. The bus architecture of claim 13, wherein the versaphy device transmits an unsolicited response to the controller.

16. The bus architecture of claim 14, wherein the versaphy label is set with a plurality of dip switches.

17. The bus architecture of claim 14, wherein the versaphy label is stored in the versaphy register.

18. The bus architecture of claim 14, wherein the versaphy register contains a profile.

19. The bus architecture of claim 15, further including a plurality of versaphy devices coupled to the 1394 bus.

20. The bus architecture of claim 15, further including a plurality of controllers coupled to the 1394 bus.

21. A method of operating an extended bus architecture, comprising the steps of:
    connecting a controller to a 1394 bus;
    connecting a versaphy device to a 1394 bus, having a static address that does not change upon a bus reset and where the versaphy device can be addressed on the 1394 bus without using a physical address;
    transmitting an unsolicited response from the versaphy device over the 1394 bus; and transmitting a versaphy write packet from the controller to the versaphy device;

writing a payload into a versaphy register of the versaphy device.

22. The method of claim 21, wherein the step of connecting the controller includes the step of populating the controller with a versaphy module.

23. The method of claim 21, wherein the step of connecting the versaphy device includes the step of setting a versaphy label.

24. The method of claim 21, wherein the step of transmitting the versaphy write packet includes inserting a versaphy label into the packet.

25. The method of claim 21, wherein the step of transmitting the versaphy write packet includes inserting a physcial-id address into the packet.

26. The method of claim 21, wherein the step of connecting the versaphy device to the 1394 bus includes the step of writing a profile into a versaphy register of the versaphy device.

27. The method of claim 23, wherein the step of setting the versaphy label includes the step of setting a plurality of dip switches.

* * * * *